United States Patent
Tirkkonen et al.

(10) Patent No.: US 9,560,648 B2
(45) Date of Patent: Jan. 31, 2017

(54) METHODS AND APPARATUS FOR PROVIDING A COMMUNICATION SCHEME WITH REDUCED FEED-BACK DELAY

(75) Inventors: Olav Emerik Tirkkonen, Helsinki (FI); Esa Tapani Tiirola, Kempele (FI); Kari Juhani Hooli, Oulu (FI); Kari Pekka Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 250 days.

(21) Appl. No.: 13/508,538

(22) PCT Filed: Dec. 18, 2009

(86) PCT No.: PCT/IB2009/055859
§ 371 (c)(1),
(2), (4) Date: May 7, 2012

(87) PCT Pub. No.: WO2011/073737
PCT Pub. Date: Jun. 23, 2011

(65) Prior Publication Data
US 2012/0275357 A1    Nov. 1, 2012

(51) Int. Cl.
*H04W 4/18* (2009.01)
*H04W 72/04* (2009.01)
(Continued)

(52) U.S. Cl.
CPC ........ *H04W 72/0446* (2013.01); *H04L 1/0083* (2013.01); *H04L 27/2602* (2013.01); *H04L 1/1812* (2013.01); *H04L 5/14* (2013.01)

(58) Field of Classification Search
CPC . H04B 7/2656; H04B 7/2615; H04L 27/2602; H04W 4/18; H04W 72/0446; H04W 27/2602; H04J 3/00; H04J 4/00
(Continued)

(56) References Cited

U.S. PATENT DOCUMENTS 8,913,532 B1 * 12/2014 Fang et al. .................... 370/294
2002/0101359 A1    8/2002 Huckaba et al.
(Continued)

FOREIGN PATENT DOCUMENTS

CN    101150389 A    3/2008
EP    1523210 A2    4/2005
(Continued)

OTHER PUBLICATIONS

International Search Report and Written Opinion received for corresponding International Patent Application No. PCT/IB2009/055859, dated Sep. 21, 2010, 12 pages.
(Continued)

*Primary Examiner* — Andrew Chriss
*Assistant Examiner* — Romani Ohri
(74) *Attorney, Agent, or Firm* — Mintz Levin Cohn Ferris Glovsky and Popeo, P.C.

(57) ABSTRACT

An apparatus for providing reduced feedback delay may include at least one processor and at least one memory including computer program code. The at least one memory and the computer program code may be configured, with the processor, to cause the apparatus to perform at least selecting a frame format to be applied for configuring transmission and reception of data. The frame format may be selected from options including a downlink only format, an uplink only format and a downlink and uplink format. The apparatus may be further configured for communicating the frame format to a transceiver to enable configuration of the transceiver for transmission and reception of data according to the frame format selected. A corresponding method and computer program product are also provided.

20 Claims, 7 Drawing Sheets (51) Int. Cl.
*H04L 27/26* (2006.01)
*H04L 1/00* (2006.01)
*H04L 5/14* (2006.01)
*H04L 1/18* (2006.01)

(58) Field of Classification Search
USPC .......................................... 370/310, 338, 281
See application file for complete search history.

(56) References Cited

U.S. PATENT DOCUMENTS

| | | | |
|---|---|---|---|
| 2006/0018279 A1* | 1/2006 | Agrawal et al. | 370/330 |
| 2007/0291713 A1* | 12/2007 | Machida | 370/338 |
| 2008/0144530 A1* | 6/2008 | Che et al. | 370/254 |
| 2008/0225802 A1* | 9/2008 | Sun et al. | 370/336 |
| 2008/0285591 A1 | 11/2008 | Kim et al. | |
| 2009/0116427 A1 | 5/2009 | Marks et al. | |
| 2009/0122731 A1* | 5/2009 | Montojo et al. | 370/280 |
| 2010/0238845 A1* | 9/2010 | Love et al. | 370/280 |

FOREIGN PATENT DOCUMENTS

| | | |
|---|---|---|
| WO | 2008/039027 A1 | 4/2008 |
| WO | 2008038088 | 4/2008 |
| WO | 2009/060164 A1 | 5/2009 |
| WO | 2009061403 | 5/2009 |
| WO | WO-2009060164 | 5/2009 |

OTHER PUBLICATIONS

Supplemental European Search Report received for corresponding European Application No. EP 09 85 2223, dated Oct. 14, 2013, 2 pages.

European Search Opinion received for corresponding European Application No. EP 09 85 2223, dated Oct. 14, 2013, 3 pages.

* cited by examiner

METHODS AND APPARATUS FOR PROVIDING A COMMUNICATION SCHEME WITH REDUCED FEED-BACK DELAY

RELATED APPLICATION

This application was originally filed as PCT Application No. PCT/IB2009/055859 filed Dec. 18, 2009.

TECHNOLOGICAL FIELD

Embodiments of the present invention relate generally to communication technology and, more particularly, relate to an apparatus and method for providing a communication scheme with reduced feedback delay.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access networks (UTRAN and E-UTRAN) and the GERAN (GSM/EDGE radio access network) system are currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards. LTE, like many other communication networks, employs base stations that are connected to a network in order to wirelessly communicate with wireless communication devices that may be distributed throughout a coverage area of a given base station.

The base stations, which are typically referred to as eNBs (enhanced node Bs) in LTE, typically serve as wireless communication access points (APs) for a wireless communication device that may be referred to as, for example, a subscriber station (SS), a mobile station (MS), a mobile terminal (MT) or user equipment (UE). A recent focus in relation to wireless broadband access networks has been on improving performance with respect to mobile devices. However, given that network resources are limited or have associated costs, it is desirable to improve performance in balance with and consideration of the costs in terms of network resources.

BRIEF SUMMARY OF EXAMPLE EMBODIMENTS

A method and apparatus are therefore provided that may enable the provision of improved network performance in the form of a reduction of feedback delay for a communication system. Accordingly, for example, some embodiments of the present invention may provide for reductions to latency experienced in communication systems by reducing feedback delays.

In one exemplary embodiment, a method of providing a communication scheme with reduced feedback delay is provided. The method may include selecting a frame format to be applied for configuring transmission and reception of data. The frame format may be selected from options including a downlink only format, an uplink only format and a downlink and uplink format. The method may further include communicating the frame format to a transceiver to enable configuration of the transceiver for transmission and reception of data according to the frame format selected.

In another exemplary embodiment, a computer program product for providing a communication scheme with reduced feedback delay is provided. The computer program product includes at least one computer-readable storage medium having computer-executable program code instructions stored therein. The computer-executable program code instructions may include program code instructions for selecting a frame format to be applied for configuring transmission and reception of data. The frame format may be selected from options including a downlink only format, an uplink only format and a downlink and uplink format. The computer-executable program code instructions may further include instructions for communicating the frame format to a transceiver to enable configuration of the transceiver for transmission and reception of data according to the frame format selected.

In another exemplary embodiment, an apparatus for providing a communication scheme with reduced feedback delay is provided. The apparatus may include at least one processor and at least one memory including computer program code. The at least one memory and the computer program code may be configured, with the processor, to cause the apparatus to perform at least selecting a frame format to be applied for configuring transmission and reception of data. The frame format may be selected from options including a downlink only format, an uplink only format and a downlink and uplink format. The apparatus may be further configured for communicating the frame format to a transceiver to enable configuration of the transceiver for transmission and reception of data according to the frame format selected.

Embodiments of the invention may provide a method, apparatus and computer program product for employment in devices so that, for example, device users may enjoy communication with other devices with less delay.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

Some embodiments of the present invention may provide a mechanism by which improvements may be experienced in relation to feedback delay reduction in a communication system. In an example embodiment, in a LTE or LTE-A (LTE Advanced) network, APs or eNBs may be equipped with an ability to perform frame (or sub-frame) format selection to configure transmission and reception of signals according to the selected format. The formats that are selectable will be described in greater detail below.

Some embodiments of the present invention may be utilized in connection with a local area optimized radio system (e.g., part of the Third Generation Partnership Project (3GPP) LTE Release 11 or some other release). For example, some embodiments may provide improvements to communications relating to the hybrid automatic repeat request (HARQ) error control method. In this regard, some embodiments may reduce feedback delay in time division duplexing (TDD) based radio systems.

Local area radio systems (e.g., Revolutionary Optimized Local Area (REVOLA)) are currently being designed to complement existing cellular wide area systems (e.g., GSM/UMTS/HSPA/LTE). Unlike a typical wide area cellular system, the local area systems being developed may be enabled to utilize the license-exempt spectrum or white spaces to take advantage of the additional available bandwidth therein. In addition, the local area system being developed may offer an efficient device-to-device operation mode to establish ad-hoc networks.

Figure 1:
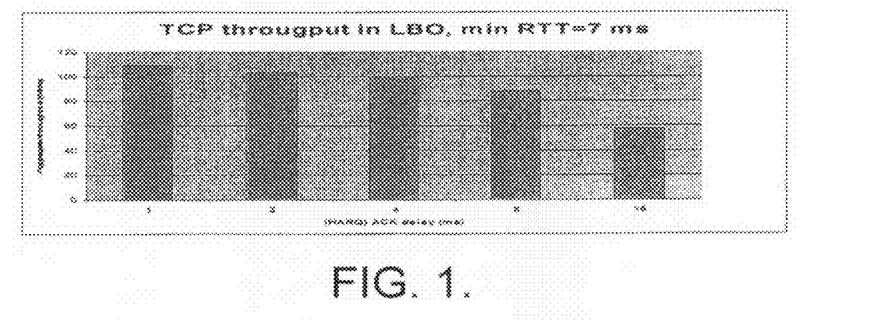
FIG. 1 illustrates the relationship between HARQ acknowledge (ACK) delay and simulated TCP throughput in local brake out (LBO) conditions where the RTT of air interface represents a large portion of total RTT.

The radio interface of the REVOLA concept may be derived from state-of-the-art radios designed for 3GPP LTE-Advanced standardization with perhaps some modifications to account for the fact that uncoordinated deployments and dynamic TDD switching points are likely to be used in any new system. Since it is known that reducing RTT (round trip time) may increase Transmission Control Protocol (TCP) throughput, it may be desirable to develop a system that considers effects on RTT. FIG. 1 illustrates the relationship between HARQ acknowledge (ACK) delay and simulated TCP throughput in local brake out (LBO) conditions where the RTT of air interface represents a large portion of total RTT.

Figure 2:
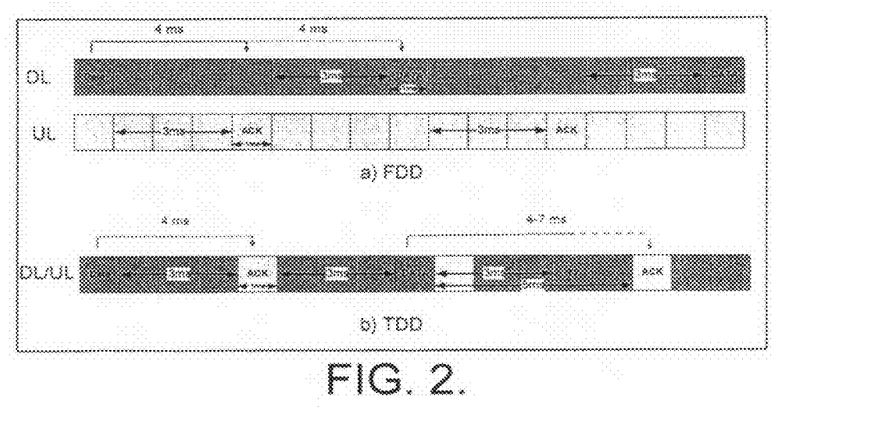
FIG. 2 illustrates an example showing a HARQ timing diagram for LTE-FDD and LTE-TDD.

From the perspective of delay performance, TDD may be considered to be more challenging than FDD (frequency division duplexing). In this regard, FIG. 2 illustrates an example showing a HARQ timing diagram for LTE-FDD and LTE-TDD. For LTE-FDD, HARQ re-transmission delay is typically fixed at 8 ms. However, LTE-TDD may suffer from additional delay components due to the unavailability of the uplink (UL)/downlink (DL) at various times. Hence, HARQ re-transmission delay for LTE-TDD may be 8 ms and may vary according to link direction, subframe number and UL/DL configuration.

LTE-TDD has a special sub-frame that may be used when the transmission direction changes from DL to UL. The special subframe may include a downlink part (e.g., a downlink pilot time slot (DwPTS)), a guard period and a uplink part (e.g., an uplink pilot time slot (UpPTS)). However, switching between UL and DL modes for LTE-TDD typically occurs in the time scale of multiple subframes. Thus, there is typically no support for efficient fast switching between UL and DL modes within a single subframe. Furthermore, any changes to be made to the TDD configuration would typically be instituted very slowly due to the fact that such changes are part of broadcasted system information.

Figure 3:
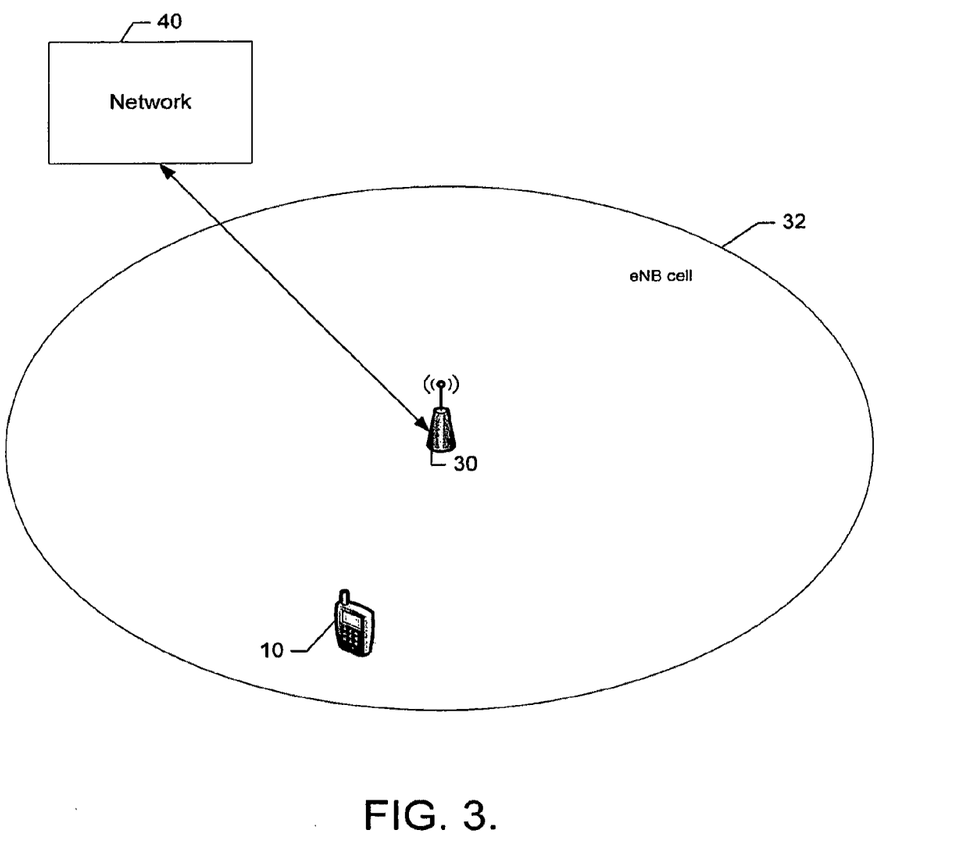
FIG. 3 illustrates one example of a communication system according to an example embodiment of the present invention.

However, some embodiments of the present invention provide for a reduction in feedback delay (e.g., HARQ feedback delay in TDD-based radio systems) while maintaining favorable interference properties toward neighboring cells. FIG. 3 illustrates a generic system diagram in which devices that may benefit from embodiments of the present invention are shown in an example communication environment. It should be noted that although FIG. 3 shows one example communication environment, other communication environments in connection with which embodiments of the present invention may be practiced are also possible. As such, in some cases more instances of some of the components described herein, or components with similar functions in networks other than the example network described herein could alternatively be employed in connection with embodiments of the present invention.

As shown in FIG. 3, an embodiment of a system in accordance with an example embodiment of the present invention may include a UE 10 and an eNB 30. The eNB 30 may be an example of a base station or access point for communication with a network 40 (for example LTE-A). As such, the eNB 30 may employ hardware including, for example, an antenna to provide for transmitting and/or receiving communication signals and processing circuitry to enable control of the eNB 30 in accordance with applicable communication standards.

The network 40 may include a collection of various different nodes, devices or functions that may be in communication with each other via corresponding wired and/or wireless interfaces. As such, the illustration of FIG. 3 should be understood to be an example of a broad view of certain elements of the system and not an all inclusive or detailed view of the system or the network 40. One or more communication terminals such as the UE 10 may be in communication with the network 40 and/or each other via the network 40 and each may include an antenna or antennas for transmitting signals to and for receiving signals from a base site (e.g., eNB 30), which could be, for example a base station that is a part of one or more cellular or mobile networks (e.g., wideband code division multiple access (W-CDMA), CDMA2000, global system for mobile communications (GSM), general packet radio service (GPRS), LTE and/or the like) or an access point that may be coupled to a data network, such as a local area network (LAN), a metropolitan area network (MAN), and/or a wide area network (WAN), such as the Internet, which may employ any of a number of different wireline or wireless communication techniques, including wireless LAN (WLAN), Worldwide Interoperability for Microwave Access (WiMAX), WiFi, ultra-wide band (UWB), Wibree techniques and/or the like. In turn, other devices such as processing devices (e.g., personal computers, server computers or the like) may be coupled to the UE 10 via the network 40. By directly or indirectly connecting the UE 10 and other devices to the network 40 or to each other, the UE 10 may be enabled to communicate with the network 40 and/or other devices, for example, according to numerous communication protocols including Hypertext Transfer Protocol (HTTP) and/or the like, to thereby carry out various communication or other functions of the UE 10.

In example embodiments, the UE 10 may be a mobile communication device such as, for example, a personal digital assistant (PDA), wireless telephone, mobile computing device, camera, video recorder, audio/video player, positioning device (e.g., global positioning system (GPS)), game device, television device, radio device, or various other like devices or combinations thereof. As such, the UE 10 may include, for example, processing circuitry that may include at least one processor and at least one memory for storing instructions that are executable by the processor in order to cause the UE 10 to perform corresponding operations that are defined by the instructions. In some cases, the processor of the UE 10 may be embodied as, include, or otherwise control processing hardware such as one or more application specific integrated circuits (ASICs) that are configured to provide a corresponding specific functionality.

As shown in FIG. 3, the eNB 30 may have a corresponding coverage area defining a cell (e.g., eNB cell 32) served by the eNB 30. In general, the eNB 30 may communicate with UEs within the eNB cell 32 directly via wireless links when conditions permit via a first wireless link 34 utilizing radio resources within the operating frequency band of the eNB 30. In an example embodiment, the eNB 30 may communicate with the UE 10 (and perhaps other UEs as well) via a series of UL and DL frames or sub-frames. Moreover, the format of the frames (referred collectively hereinafter as (sub-)frames) may be selectable to enable configuration of transmission and reception of signals to be communicated to reduce feedback delay.

Figure 4:
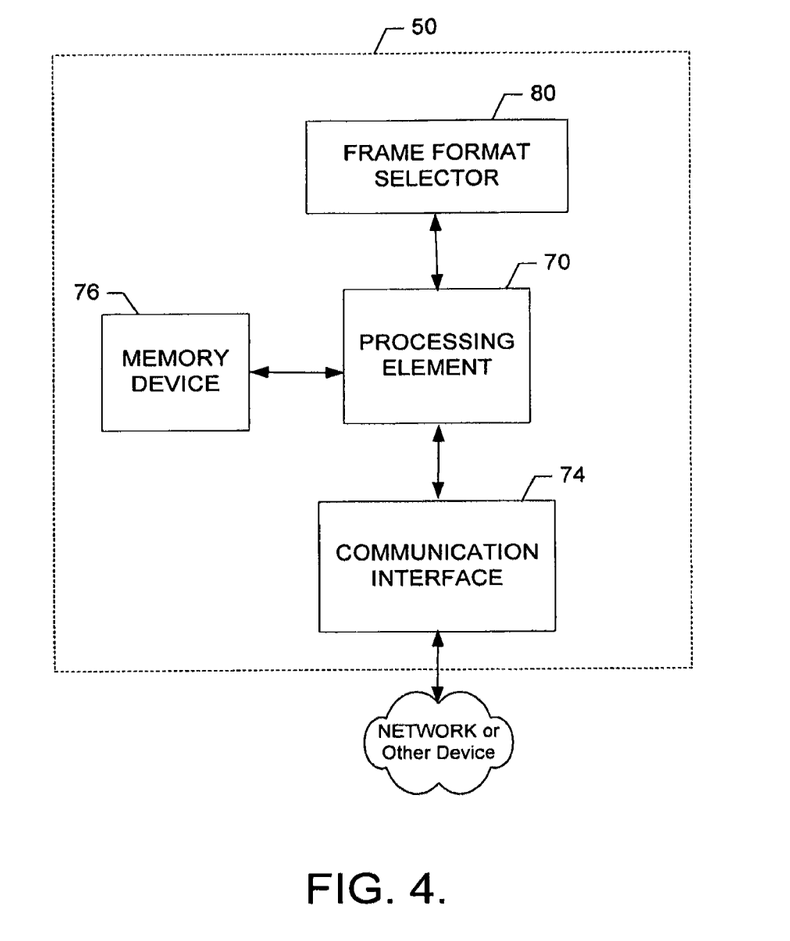
FIG. 4 illustrates a schematic block diagram of an apparatus for providing a communication scheme with reduced feedback delay according to an example embodiment of the present invention.

FIG. 4 illustrates a block diagram of an apparatus 50 for providing reduced feedback delay according to an example embodiment of the present invention. An example embodiment of the invention will now be described with reference to FIG. 4, in which certain elements of the apparatus 50 for providing reduced feedback delay are displayed. The apparatus 50 of FIG. 4 may be employed, for example, on a communication device (e.g., the eNB 30 or another AP of a communication system) or a variety of other devices, such as, for example, any of the devices listed above. However, it should be noted that the components, devices or elements described below may not be mandatory and thus some may be omitted in certain embodiments. Additionally, some embodiments may include further components, devices or elements beyond those shown and described herein.

Referring now to FIG. 4, the apparatus 50 may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an eNB, AP or other network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control a frame format selector 80. The frame format selector 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the frame format selector 80 as described herein. Thus, in examples in which software is employed, a device or circuitry (e.g., the processor 70 in one example) executing the software forms the structure associated with such means.

In an example embodiment, the frame format selector 80 is configured to enable selection of a (sub-)frame format to provide configuration for the transmission and reception of messages based on the selected format at a first transceiver (e.g., the eNB 30 or some other AP). The frame format selector 80 is also configured to provide information indicative of the selected (sub-)frame format to at least a second transceiver (e.g., the UE 10 and perhaps others) to enable the second transceiver to be configured for transmission and reception accordingly as well. In an example embodiment, the applicable (sub-)frame formats that may be selected from may include a "DL only" option, a "UL only" option and a "DL and UL" option. Accordingly, the frame format selector 80 may be configured to dynamically select a (sub-)frame format based on instantaneous needs for transmitting UL/DL data and control signals between the first and second transceivers.

Figure 5:
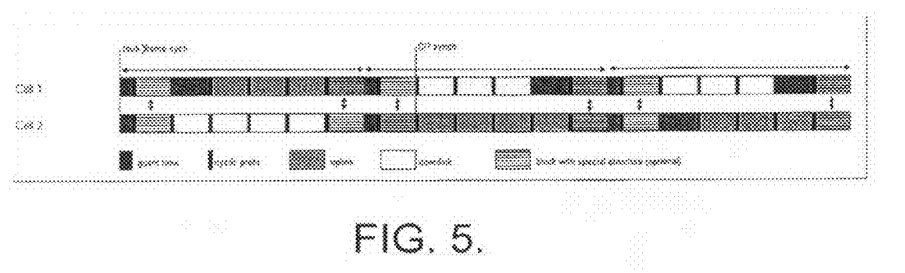
FIG. 5 illustrates an example structure for a frame format according to an example embodiment of the present invention.

In an exemplary embodiment, the applied (sub-)frame formats may be characterized in that each (sub-)frame may be divided into a number of blocks having a corresponding cyclic prefix (CP). The applied (sub-)frame formats may also be characterized in that guard time between DL and UL portions in the "DL and UL" format may be reserved. Additionally, the applied (sub-)frame format may be characterized in that the length of the guard time within a (sub-)frame may correspond to the duration of one block and one CP. Furthermore, in an example embodiment, a special signal structure may be provided allowing at least partial orthogonality properties between UL and DL parts provided for at least one block of a sub-frame. It should be noted that, in some embodiments, in order to benefit from the properties of special block, the interfering signals need to be time synchronized with each other. FIG. 5 illustrates an example with the structure described above.

Figure 6:
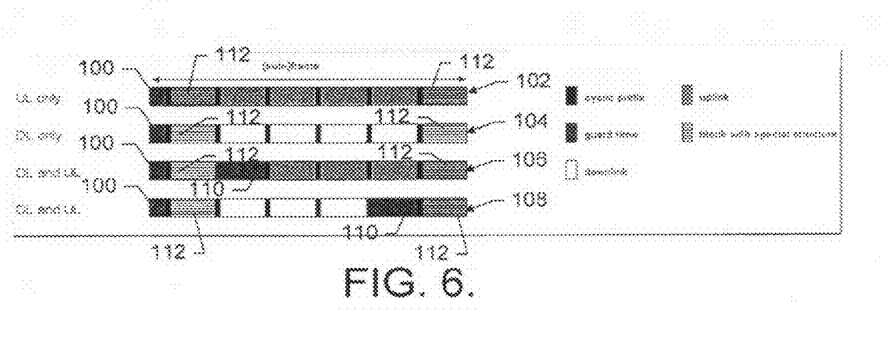
FIG. 6 illustrates an example (sub-)frame format in accordance with an example embodiment of the present invention.

FIG. 6 shows an example embodiment of a first example (sub-)frame format. As shown in FIG. 6, a guard period 100 is provided at the beginning of each (sub-)frame. However, it should be appreciated that the guard period 100 could alternatively be positioned at another location in each (sub-)frame (e.g., at the end or even at the beginning and end of each (sub-)frame). The guard period 100 enables fully dynamic UL/DL switching between the subframes. (Sub-)frame UL only is shown as example (sub-)frame 102 while example (sub-)frame 104 shows a DL only (sub-)frame. Example (sub-)frames 106 and 108 show DL and UL (sub-)frames. (Sub-)frame format 'DL and UL' includes an addition guard period 110 (e.g., one block +one CP), which allows fully dynamic switching from DL to UL (or vice versa) within the corresponding (sub-)frame. In an example embodiment, it is possible to adjust the ratio between DL and UL by changing the position of the guard period 110.

In an example embodiment, it may be possible for a DL part to precede an UL part (e.g., as shown in example (sub-)frame 108). In this regard, the second transceiver (e.g., the UE 10) may be enabled to detect the applied (sub-)frame format from the first DL part. As such, it may be possible to have a common frequency resource allocation for UL and DL portions. However, it is also possible that the UL part may precede the DL part in some examples. The ordering of UL and DL parts may be dependent on the location at which delay changes are provided in the (sub-)frame format and/or which delay changes are signaled.

Figure 7:
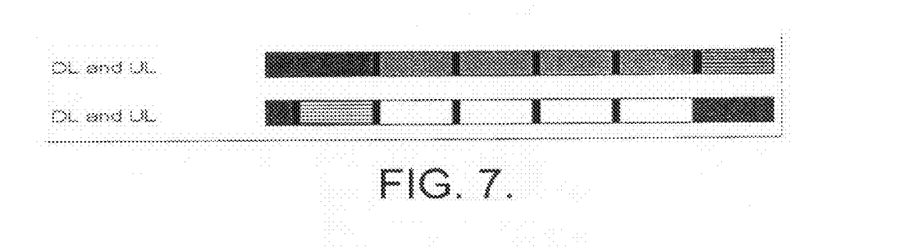
FIG. 7 illustrates another example (sub-)frame format in accordance with an example embodiment of the present invention.

In another example embodiment, at least one block of each (sub-)frame may be configured to have a special signal structure (e.g., special blocks 112) which enables orthogonalization of some DL and UL control and/or reference signals (e.g., critical UL and DL control and/or reference signals). The orthogonalization of these control and/or reference signals may minimize or at least reduce the impact of crossed-block interference. In this example embodiment, the first and last blocks of the (sub-)frame may be designated as the special blocks 112 carrying specified (e.g., critical) control signals and/or reference signals. As an alternative, the second special block in a (sub-) frame may be positioned after the guard period. Moreover, in some examples, the 'DL and UL' format may be configured such that UL-to-DL, DL-to-UL interference for most-critical control and/or reference signals is completely avoided. FIG. 7 shows an example illustrating this principle.

Figure 8:
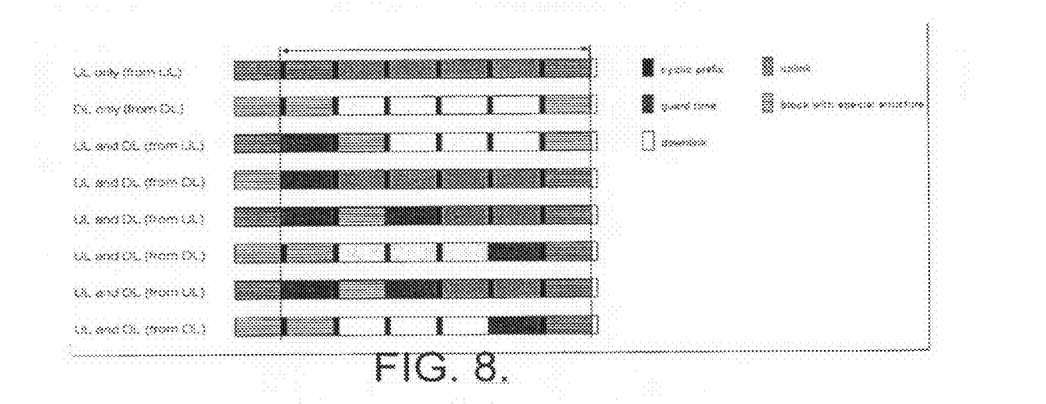
FIG. 8 illustrates an example (sub-)frame format in which a DL portion may be transmitted first and an UL part may be transmitted at the end of the (sub-)frame in accordance with an example embodiment of the present invention.
Figure 9:
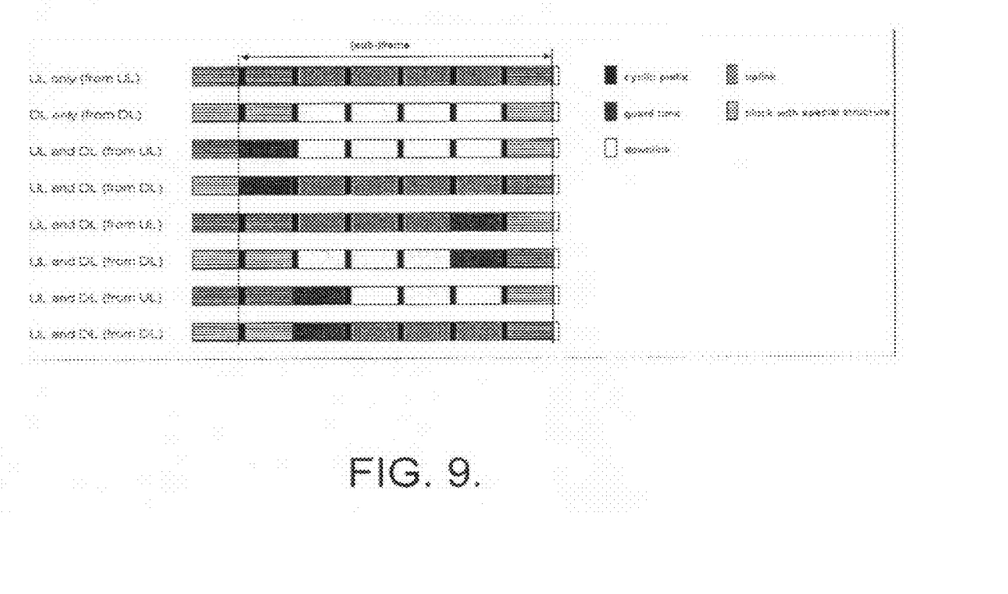
FIG. 9 illustrates an example (sub-)frame format structure in a situation in which the placement of UL and DL varies from (sub-)frame to (sub-)frame based on the type of previous (sub-)frame in accordance with an example embodiment of the present invention.

FIGS. 8 and 9 illustrate principles corresponding to a second (sub-)frame format according to an example embodiment. Following the principles shown in FIGS. 8 and 9, no fixed guard per (sub-)frame is reserved. Instead, the guard period 120 is provided only when the link direction changes. As such, for example, the presence of the guard period 120 in the examples of FIGS. 8 and 9 is used in DL and UL (sub-)frames to signal a change from UL to DL or from DL to UL. As such, in this example scheme, the previous (sub-)frame format has an impact on the format of the next (sub-)frame. FIG. 8 shows the principle described above with the assumption that a possible DL portion may be transmitted first, and the UL part may be transmitted at the end of the (sub-)frame. In this scheme, the number of guard blocks associated with the guard period 120 varies between 0 and 2. FIG. 9 shows the same structure in a situation in which the placement of UL and DL varies from (sub-)frame to (sub-)frame based on the type of previous (sub-) frame.

Accordingly, embodiments of the present invention may enable reduction of HARQ latency in TDD-based systems while still maintaining favorable interference conditions toward neighboring cells. In this regard, the TDD-HARQ latency may be made independent from the UL/DL configuration. As such, embodiments of the present invention may provide improved physical layer latency and thereby also provide improved TCP throughput for TCP traffic in LBO conditions. Thus, UL/DL switching can be accomplished based on needs or requirements associated with the actual data transmissions conducted within a cell rather than based on ACK/NACK signaling needs, which may introduce a TCP delay.

Figure 10:
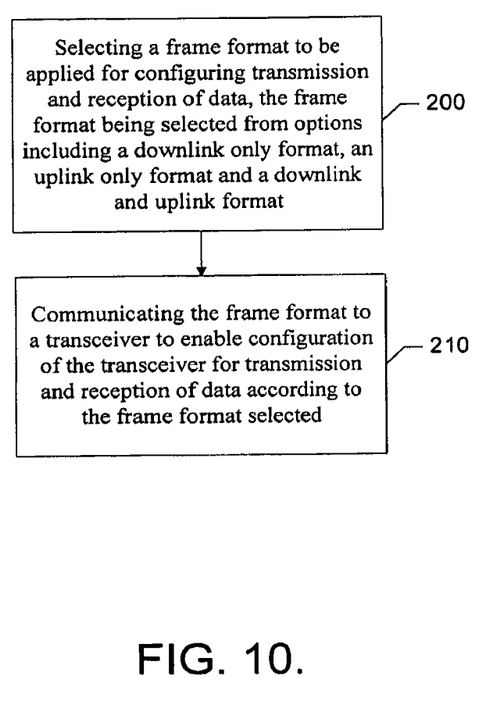
FIG. 10 illustrates a flowchart of yet another method of providing a communication scheme with reduced feedback delay in accordance with an example embodiment of the present invention.

FIG. 10 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks or steps of the flowcharts support combinations of means for performing the specified functions, combinations of steps for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for providing reduced feedback delay according to an example embodiment, as shown in FIG. 10, may include selecting a frame format to be applied for configuring transmission and reception of data at operation 200. The frame format may be selected from options including a downlink only format, an uplink only format and a downlink and uplink format. The method may further include communicating the frame format to a transceiver to enable configuration of the transceiver for transmission and reception of data according to the frame format selected at operation 210.

In some embodiments, certain ones of the operations above may be modified or further amplified as described below. Modifications or amplifications to the operations above may be performed in any order and in any combination. In this regard, for example, selecting the frame format may include selecting the frame format dynamically based on instantaneous data transmission requirements or based on control signals transmitted between the transceiver and a device associated with the processor. In some cases, selecting the frame format may include selecting the frame format such that each frame is divided into a number of blocks having a cyclic prefix, guard time is reserved between uplink and downlink portions in the downlink and uplink format, and length of the guard time within a given frame corresponds to duration of one block and one cyclic prefix. In an example embodiment, selecting the frame format further includes adjusting a ratio between downlink and uplink by changing a position of a guard block within a frame sequence. In some cases, selecting the frame format further includes selecting at least one block of each frame to have a structure enabling orthogonalization of downlink and uplink control and/or reference signals and/or selecting a frame format including a variable number or guard blocks in which each guard block indicates a link direction change.

In an example embodiment, an apparatus for performing the method of FIG. 10 above may comprise at least one processor (e.g., the processor 70) configured to perform some or each of the operations (200-210) described above. The processor may, for example, be configured to perform the operations (200-210) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-210 may comprise, for example, the processor 70, respective ones of the frame format selector 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to perform at least the following:
   select, based at least in part on uplink and/or downlink transmission requirements for the apparatus, a format of a subframe for transmission and reception of data, wherein the subframe consists of a plurality of data blocks, wherein each of the plurality of data blocks is preceded by a cyclic prefix, wherein the selected format of the subframe is selected from a group of options, the group including a first format comprising downlink blocks, uplink blocks, and at least one guard portion to provide switching time between transmission and reception phases, wherein the at least one guard portion is dynamically placed among the plurality of data blocks based at least in part on the uplink and/or downlink transmission requirements; and
   communicate the format of the subframe to a transceiver to enable configuration of the transceiver for transmission and reception of data according to the selected frame format.

2. The apparatus of claim 1, wherein the memory and computer program code are further configured to, with the processor, cause the apparatus to at least:
   select the format of the subframe dynamically based on control signals transmitted between the transceiver and an associated device.

3. The apparatus of claim 1, wherein the memory and computer program code are further configured to, with the processor, cause the apparatus to at least:
   select the format of the subframe such that a length of the at least one guard portion within a given frame corresponds to a duration of one of the plurality of data blocks together with one of the preceding cyclic prefixes.

4. The apparatus of claim 1, wherein the memory and computer program code are configured to, with the processor, cause the apparatus to at least:
   adjust a ratio between a downlink portion of the selected format of the subframe and an uplink portion of the selected format of the subframe by changing a position of the at least one guard portion within a frame sequence.

5. The apparatus of claim 1, wherein the memory and computer program code are configured to, with the processor, cause the apparatus to at least:
   select at least one of the plurality of data blocks of each subframe to have a structure enabling orthogonalization of downlink and uplink control or reference signals.

6. The apparatus of claim 1, wherein the memory and computer program code are configured to, with the processor, cause the apparatus to at least:
   select the format of the subframe such that the subframe includes a variable number of guard portions, wherein each of the at least one guard portion indicates a link direction change.

7. A method comprising:
   selecting, via a processor and based at least in part on uplink and/or downlink transmission requirements for the processor, a format of a subframe for transmission and reception of data, wherein the subframe consists of a plurality of data blocks, wherein each of the plurality of data blocks is preceded by a cyclic prefix, wherein the selected format of the subframe is selected from a group of options, the group including a first format comprising downlink blocks, uplink blocks, and at least one guard portion to provide switching time between transmission and reception phases, wherein the at least one guard portion is dynamically placed among the plurality of data blocks based at least in part on the uplink and/or downlink transmission requirements; and
   communicating the format of the subframe to a transceiver to enable configuration of the transceiver for transmission and reception of data according to the selected frame format.

8. The method of claim 7, wherein selecting the format of the subframe comprises selecting the format of the subframe dynamically based on control signals transmitted between the transceiver and an associated device.

9. The method of claim 7, wherein selecting the format of the subframe comprises selecting the format of the subframe such that a length of the at least one guard portion within a given frame corresponds to a duration of one of the plurality of data blocks together with one of the preceding cyclic prefixes.

10. The method of claim 7, wherein selecting the format of the subframe further comprises adjusting a ratio between a downlink portion of the selected format of the subframe and an uplink portion of the selected format of the subframe by changing a position of the at least one guard portion within a frame sequence.

11. The method of claim 7, wherein selecting the format of the subframe further comprises selecting at least one of the plurality of data blocks of each subframe to have a structure enabling orthogonalization of downlink and uplink control or reference signals.

12. The method of claim 7, wherein selecting the format of the subframe further comprises selecting the format of the subframe such that the subframe includes a variable number of guard portions, wherein each of the at least one guard portion indicates a link direction change.

13. A non-transitory computer program product comprising at least one computer-readable storage medium having computer-executable program code instructions stored therein, the computer-executable program code instruction comprising:
   program code instructions for selecting, via a processor and based at least in part on uplink and/or downlink transmission requirements for the processor, a format of a subframe for transmission and reception of data, wherein the subframe consists of a plurality of data blocks, wherein each of the plurality of data blocks is preceded by a cyclic prefix, wherein the selected format of the subframe is selected from a group of options, the group including a first format comprising downlink blocks, uplink blocks, and at least one guard portion to provide switching time between transmission and reception phases, wherein the at least one guard portion is dynamically placed among the plurality of data blocks based at least in part on the uplink and/or downlink transmission requirements; and program code instructions for communicating the format of the subframe to a transceiver to enable configuration of the transceiver for transmission and reception of data according to the selected frame format.

14. The non-transitory computer program product of claim 13, wherein program code instructions for selecting the frame format include instructions for selecting the format of the subframe dynamically based on control signals transmitted between the transceiver and an associated device.

15. The non-transitory computer program product of claim 13, wherein program code instructions for selecting the frame format include instructions for selecting the frame format such that a length of the at least one guard portion within a given frame corresponds to a duration of one of the plurality of data blocks together with one of the preceding cyclic prefixes.

16. The non-transitory computer program product of claim 15, wherein program code instructions for selecting the frame format include instructions for adjusting a a ratio between a downlink portion of the selected format of the subframe and an uplink portion of the selected format of the subframe by changing a position of the at least one guard portion within a frame sequence.

17. The non-transitory computer program product of claim 13, wherein program code instructions for selecting the frame format include instructions for selecting at least one of the plurality of data blocks of each subframe to have a structure enabling orthogonalization of downlink and uplink control or reference signals.

18. The apparatus of claim 1, wherein the group of options further includes:
   a second format comprising downlink blocks and no uplink blocks; and
   a third format comprising uplink blocks and no downlink blocks.

19. The method of claim 7, wherein the group of options further includes:
   a second format comprising downlink blocks and no uplink blocks; and
   a third format comprising uplink blocks and no downlink blocks.

20. The non-transitory computer program product of claim 13, wherein the group of options further includes:
   a second format comprising downlink blocks and no uplink blocks; and
   a third format comprising uplink blocks and no downlink blocks.

* * * * *